United States Patent [19]

Hirosawa et al.

[11] Patent Number: 5,838,837
[45] Date of Patent: Nov. 17, 1998

[54] IMAGE SYNTHESIZING DEVICE

[75] Inventors: Masashi Hirosawa, Yamatokooriyama; Yoshihiro Kitamura, Osaka, both of Japan

[73] Assignee: Sharp Kabushiki Kaisha, Osaka, Japan

[21] Appl. No.: 629,314

[22] Filed: Apr. 8, 1996

[30] Foreign Application Priority Data

Apr. 10, 1995 [JP] Japan .................................. 7-083833

[51] Int. Cl.⁶ .............................. G06K 9/36; G06K 9/32; G06K 9/54; G06K 9/60
[52] U.S. Cl. ........................ 382/284; 382/284; 382/294; 382/295; 382/296; 382/298; 382/305; 358/450
[58] Field of Search .................................. 382/284, 294, 382/295, 296, 298, 305; 358/450

[56] References Cited

U.S. PATENT DOCUMENTS

| | | | |
|---|---|---|---|
| 4,794,932 | 1/1989 | Baba .................................. | 128/661.09 |
| 5,465,163 | 11/1995 | Yoshihara et al. ....................... | 382/284 |
| 5,621,867 | 4/1997 | Murata et al. .......................... | 395/130 |
| 5,625,720 | 4/1997 | Miyaza et al. .......................... | 382/284 |

FOREIGN PATENT DOCUMENTS

| | | | |
|---|---|---|---|
| 0 591974 | 4/1994 | European Pat. Off. ....... | H04N 1/387 |
| 0 655712 | 5/1995 | European Pat. Off. .......... | G06T 7/00 |
| 3-216771 | 9/1991 | Japan .............................. | G06F 15/66 |
| 3-240372 | 10/1991 | Japan ............................. | H04N 5/225 |
| 4-329482 | 11/1992 | Japan ............................. | G06F 15/66 |

OTHER PUBLICATIONS

Scaling Binary Images: Key to High–Quality Imaging Systems; Brian Bissett, *Computer Technology Review;* Feb. 11, 1992, pp. 109–113.

A Rotation Method for Raster Image Using Skew Transformation; A Tanaka et al.; 1986 IEEE, pp. 272–277.

*Primary Examiner*—Andrew W. Johns
*Assistant Examiner*—Daniel G. Mariam

[57] ABSTRACT

An image synthesizing device in which partial images can be rapidly processed (for example, by enlarging, reducing, turning) and synthesized. When synthesizing information for partial images stored in a partial image storage portion is calculated by a synthesizing data calculating portion, accessible rectangular areas, which consist each of a plurality of pixel rows and columns, of partial images stored in the partial image storage portion are accessed one by one by a partial image accessing portion and each of accessed areas is processed by enlarging or reducing or turning on the basis of the calculation results given from the synthesizing data calculating portion. The processed partial images whose areas have been enlarged, reduced or turned, are synthesized by a partial image synthesizing portion on the basis of the synthesizing information, and a synthesized image is stored in a synthesized image storage portion.

14 Claims, 18 Drawing Sheets

FIG.15A  FIG.15B  FIG.15C
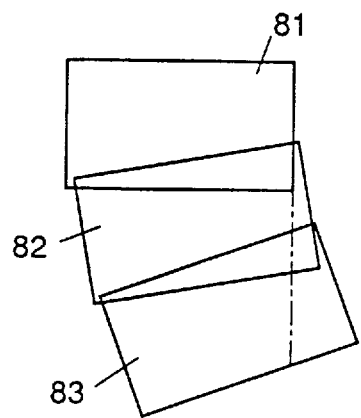
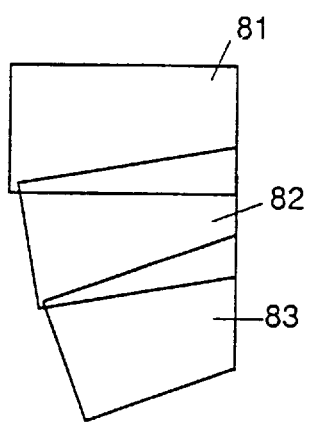
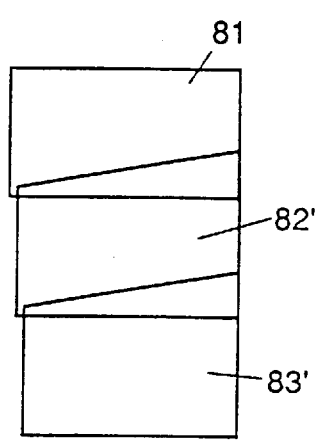
FIG.16A  FIG.16B
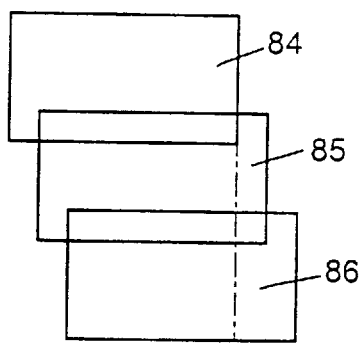
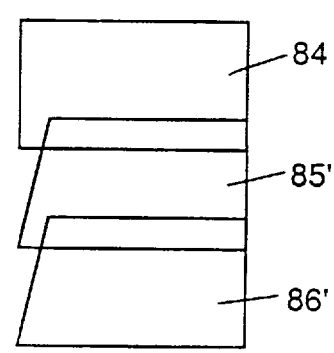

IMAGE SYNTHESIZING DEVICE

BACKGROUND OF THE INVENTION

The present invention relates to an image synthesizing device for combining a plurality of partial images taken from a part of an object to form a synthesized image.

To obtain a highly fine image at a relatively low cost, there has been adopted a method of synthesizing an image from a plurality of highly fine partial images taken from a part of an object. For example, Japanese Laid-Open Patent No. 3-240372 discloses that a plurality of partial images of an object is taken through a charge-coupled device (CCD) by two-dimensionally moving said device on an image forming plane and the obtained partial images are synthesized into one image of a highly fine quality.

In synthesizing a plurality of partial images, it is necessary to combine the partial images as turned, enlarged or reduced in size so that the partial images adjoining to each other may match in detail. Affine transformation by using trigonometric functions is generally used for turning, enlarging and reducing each partial image. To obtain, e.g., a turned partial image by the affine transformation with trigonometric functions, it is necessary to perform calculating operation by pixel therein, requiring so much time not to realize high-speed processing.

Japanese Laid-Open Patent No. 3-216771 discloses such a method that an image is divided into blocks and pixels of each block are processed row by row to form a turned image. This method is so called DDA conversion method by which a turned image is obtained by calculating a row of pixels in a turned image corresponding to a row of pixels in an initial image and by applying the calculation result to other rows of pixels. This method performs operation by row at a reduced amount of calculations as compared with the operation by pixel, thereby resulting in saving processing time.

The above-mentioned method of obtaining, for example, a turned image by performing calculating operation by row of pixels, however, requires much time for calculation of pixel rows and thereby can not realize high-speed processing for synthesizing an image.

In synthesizing partial images by enlarging and turning, the partial images may not accurately be combined to each other, i.e., they may have discordantly joined portions, resulting in forming a synthesized image of decreased quality.

SUMMARY OF THE INVENTION

It is an object of the present invention to provide an image synthesizing device which is capable of producing a synthesized image at a high speed of processing.

It is another object of the present invention to provide an image synthesizing device which is capable of producing a high-quality synthesized image without miss-matching of partial images combined therein.

BRIEF DESCRIPTION OF THE DRAWINGS

FIG. 15A is illustrative of an image synthesized from partial images by the image synthesizing device of FIG. 14.

FIG. 15B is illustrative of an exemplified state of the synthesized image in a synthesized image storing portion.

FIG. 15C illustrates an example of modifying a partial image by a partial image deforming portion.

FIGS. 16A illustrates another example of an image synthesized from partial images by the image synthesizing device of FIG. 14.

FIG. 16B illustrates another example of modifying a partial image by a partial image deforming portion.

PREFERRED EMBODIMENT OF THE INVENTION

Figure 1:
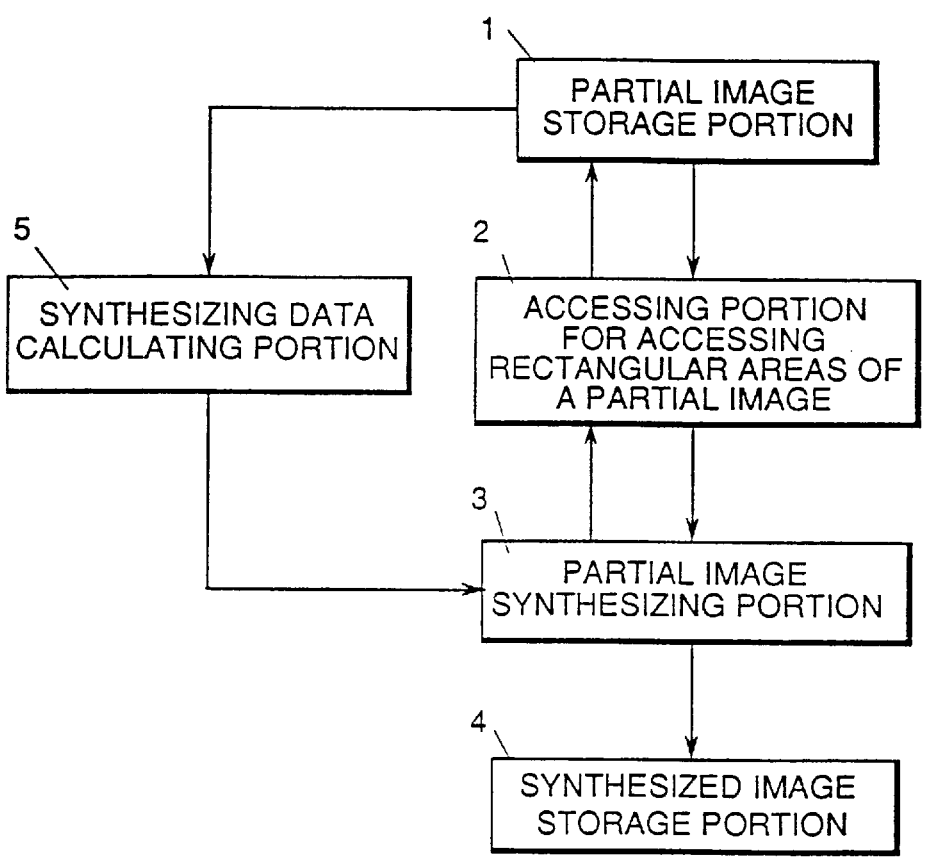
FIG. 1 is a block diagram showing an image synthesizing device embodying the present invention.

Referring now to the accompanying drawings, preferred embodiments of the present invention will be described in detail as follows:

FIG. 1 is a block diagram showing an image synthesizing device embodying the present invention. This image synthesizing device is intended to produce an image synthesized from a plurality of partial images taken from an object through an image pickup device or the like. This device has a partial image storage portion 1 for storing a plurality of partial images taken at a high-resolution power from respective parts of an object. The partial images to be stored in the partial image storage portion 1 has been taken, overlapping at joining portions of the images. Accordingly, the partial images may be synthesized as partially overlaid on one another at their joining portions.

Each partial image stored in the partial image storage portion 1 is transferred to a synthesizing data calculating portion 5 that calculates synthesizing information such as location of each partial image in a synthesized image, magnification or reduction ratio and turning amount for each partial image. The synthesizing information obtained by the synthesizing data calculating portion 5 is outputted to a partial image synthesizing portion 3.

The partial image synthesizing portion 3 instructs a partial-image rectangle-area accessing portion 2 to read a specified partial image from the partial image storage portion 1. The partial-image rectangle-area accessing portion 2 makes an access to each rectangular accessible area of the specified partial image in the partial image storage portion 1 and successively reads out the accessed rectangular areas of the partial image to the partial image synthesizing portion 3. The partial image synthesizing portion 3 combines the partial images into one image by synthesizing the partial image rectangles read-out one by one from the partial image storage portion 1 on the basis of the information such as synthesizing position, enlarging or reducing ratio and turning amount, which was obtained by the synthesizing data calculating portion 5. A thus obtained image is stored in a synthesized image storage portion 4.

Figure 2A:
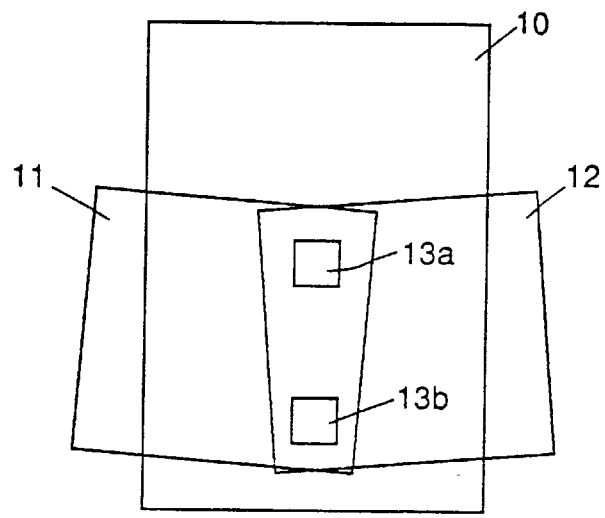
FIGS. 2A and 2B are illustrative of partial images to be synthesized by an image synthesizing device according to the present invention.
Figure 2B:
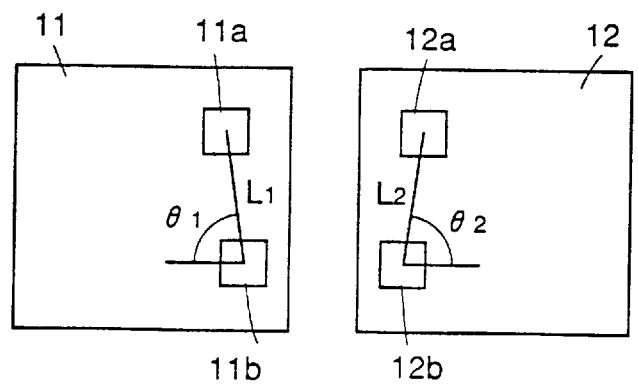

The partial image storage portion 1 holds therein, for example, partial images 11 and 12 which were taken from an object 10 in such a way that they overlap each other as shown in FIG. 2A. The synthesizing data calculating portion 5 generates information relating the partial images 11 and 12 in the following manner:

The synthesizing information calculating portion 5 reads the partial images 11 and 12 from the partial image storage portion 1 and sets, within an overlapped portion of said images, standard areas 13a and 13b each including, e.g., "m" rows and "n" columns of pixels. As shown in FIG. 2B, it makes further setting, by using a matching method, of reference areas 11a and 11b each including "m" rows×"n" columns of pixels in one partial image 11, which correspond to the standard areas 13a and 13b, and of reference areas 12a and 12b each including "m" rows×"n" columns of pixels in the other partial image 12, which correspond to the reference areas 11a and 11b.

After setting the reference areas 11a and 11b in the partial image 11 and the corresponding thereto reference areas 12a and 12b in the partial image 12, the synthesizing data calculating portion 5 determines the length of a line segment $L_1$ connecting centers of the reference areas 11a and 11b as a distance between said areas in the partial image 11 and determines the length of a line segment $L_2$ connecting centers of the reference areas 12a and 12b as a distance between said areas in the the partial image 12. An inclination $\theta_1$ of the line segment $L_1$ to a standard line in the partial image 11 and an inclination $\theta_2$ of the line segment $L_1$ in the partial image 12 are then determined.

On the basis of thus obtained distance values $L_1$ and $L_2$ and inclination values $\theta_1$ and $\theta_2$, synthesizing information concerning an enlarging ratio, reducing ratio and turning amount for the partial images 11 and 12 are generated. Namely, the enlarging or reducing ratio necessary for synthesizing the partial images 11 and 12 can be determined as a proportion of the distance $L_1$ (between the reference areas 11a and 11b) to the distance $L_2$ (between the reference areas 12a and 12b). The turning (inclination) value between the partial images 11 and 12 can be determined as a difference between the inclination values $\theta_1$ and $\theta_2$ determined for the partial images 11 and 12.

Synthesizing information concerning positions of the partial images 11 and 12 is obtained as follows: The partial images 11 and 12 are enlarged or reduced at the obtained enlarging or reducing ratio and then they are mutually turned on the basis of the obtained inclination value until the reference areas 11a, 11b and corresponding reference areas 12a, 12b match with each other at the positions of standard areas 13a and 13b shown in FIG. 2A.

Figure 3A:
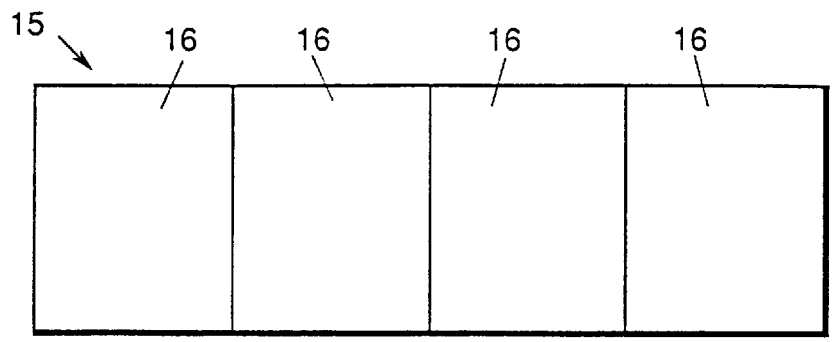
FIG. 3A is illustrative of a partial image to be synthesized by an image synthesizing device according to the present invention.
Figure 3B:
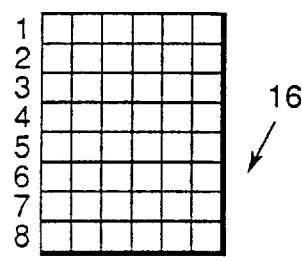
FIG. 3B is illustrative of pixels in a rectangle area of the partial image of FIG. 3A.

The operation of the partial image synthesizing portion 3 is as follows:

In the partial image storage portion 1, there is an oblong partial image 15 shown, by way of example, in FIG. 3A. The partial image synthesizing portion 3 instructs the partial-image rectangle-area accessing portion 2 to access, one by one, four (4) transversely arranged rectangular accessible areas 16 of the partial image 15 stored in the partial image storage portion 1. The partial image accessing portion 2 makes an access to each of four rectangles of the partial image 15 in the partial storage portion 2. Each rectangle 16 consists of, e.g., 6 (rows) by 8 (columns) pixels as shown in FIG. 3B.

The accessible areas 16 are divisions of the partial image 15. The number of divisions may affect the quality of synthesizable partial images after enlargement or reduction or turning. It may be said that more fine divisions of partial images can improve the quality of an image synthesized from said partial images.

In case of vertically enlarging or reducing the partial image 15 accessed by the partial image rectangle-area accessing portion 2, the partial image synthesizing portion 3 enlarges or reduces each of the rectangular areas 16 thereof in the vertical direction. In practice, each rectangular accessible area 16 is vertically enlarged or reduced by increasing or decreasing the number of pixel rows arranged from top to bottom therein. The partial image 15 is horizontally enlarged or reduced by increasing or decreasing the number of pixel columns transversely arranged in each rectangular accessible area 16 thereof.

The operation of vertically enlarging accessed rectangular areas 16 of the partial image 15 will be described as follows:

Eight (8) pixel rows in a rectangle 16 are numbered 1 to 8 from top to down. Each numbered row is divided by an enlarging ratio d (>1) and an obtained quotient is rounded to an integer by counting fractions of 5 and over as a unit. The numbered rows of the initial rectangular area 16, which correspond to the obtained integral quotients, are set as pixel rows of an enlarged area.

Figure 3C:
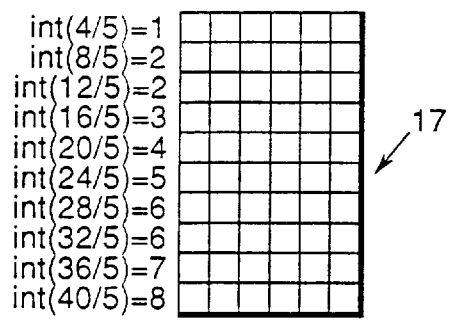
FIG. 3C is an enlarged view of the rectangle area of FIG. 2B.

In case of vertically enlarging an initial rectangular area 16, a function, which is an integral quotient obtainable by dividing n-th numbered pixel row of the initial rectangular area 16 by the enlarging ratio, is be expressed, for example, as int(n×1/d). In enlarging an accessed rectangle 16 including 8 pixel-rows of FIG. 3B by a factor of 5/4, integers 1, 2, 2, 3, 4, 5, 6, 6, 7 and 8 are obtained by calculations with the function int(n×1/d) as shown in FIG. 3C. The numbered pixel rows of the initial rectangular area 16, which correspond to the obtained integers, are set in due order as pixel rows of the enlarged area 17. Therefore, the second pixel-row and the sixth pixel-row of the initial rectangle area 16 are twice set in the enlarged rectangular area 17. Consequently, the enlarged rectangle area 17 has ten (10) pixel rows (10 vertically arranged horizontal lines of pixels) and therefore enlarged by a factor of 10/8 (=5/4) relative to the initial rectangular area 16 having eight (8) vertically arranged pixel rows.

In case of vertically reducing an initial rectangular area 16, the numbered pixel rows vertically arranged in the initial rectangular area 15 are divided one by one by a reducing ratio d (>1) and an obtained quotient is rounded to an integral (by counting fractions of 5 and over as a unit). The numbered rows of the initial rectangular area 16, which correspond to the obtained integral quotients, are set as pixel rows of a reduced rectangular area.

Figure 3D:
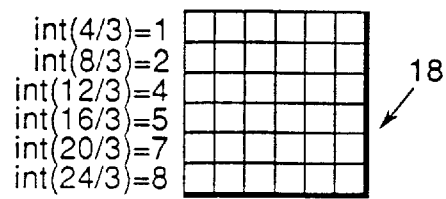
FIG. 3D is a reduced view of the rectangle area of FIG. 3B.

In case of vertically reducing an initial rectangular area 16 by a factor of 3/4, integers 1, 2, 4, 5, 7 and 8 are obtained by calculations of functions int(n×1/n) as shown in FIG. 3D. The numbered pixel rows of the initial rectangular area 16, which correspond to the obtained integers, are set in due order as pixel rows of the reduced area 18. Therefore, the third pixel-row and the sixth pixel-row of the initial rectangle area 16 are omitted in the reduced rectangular area 17. Consequently, the reduced rectangle area 17 has ten (10) vertically arranged pixel-rows and therefore reduced by a factor of 6/8 (=4/5) relative to the initial rectangular area 16 having eight (8) vertically arranged pixel-rows.

Figure 4A:
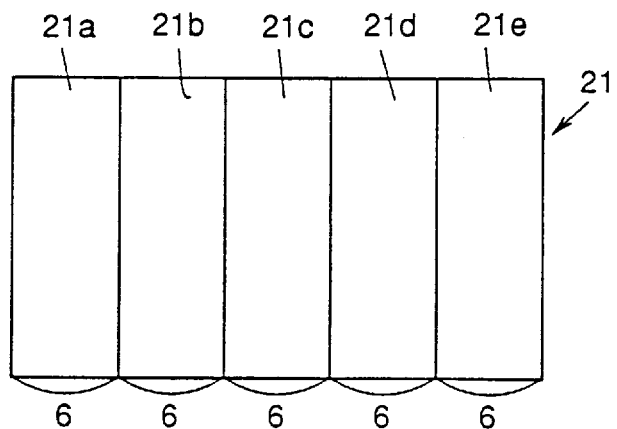
FIG. 4A is illustrative of a partial image to be synthesized by an image synthesizing device according to the present invention.

The operation of horizontally reducing a partial image 21 divided into five (5) accessible rectangle areas 21a to 21e transversely arranged as shown in FIG. 4(a) will be described as follows:

The accessible rectangular areas 21a to 21e each have 6 pixel-columns (vertical lines) arranged in the horizontal direction. Therefore, the initial partial image 21 includes 30 columns (6 columns×5) of pixels in total in the horizontal direction. In case of horizontally reducing the partial image 21 by a factor of 28/30, the number of transversely arranged pixel-columns must be reduced to 28 columns (30 columns× 28/30) in a reduced partial image. Accordingly, the partial image 21 transversely reduced by a factor of 28/30 can be obtained by omitting two columns from 30 columns of pixels of the initial partial image.

Figure 4B:
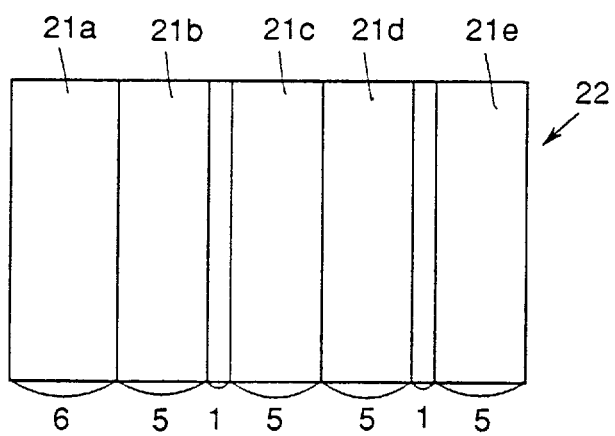
FIG. 4B is a transversely enlarged view of the partial image of FIG. 4A.

Two columns of pixels are removed from two of four boundary portions of five accessible rectangle areas 21a to 21e of the partial image 21. Two columns to be omitted are designated by calculating functions int(5/3 ×n) like the case of reducing the partial image 21 composed of five accessible rectangles by a factor of 3/5 by omitting two rectangles. The function int(5/3×n) can be 1, 3 and 5 when n=1, 2 and 3. Namely, two columns may be omitted by one at the second and fourth boundaries. Accordingly, the partial image 21 may be synthesized in such a way that among five transversely arranged accessible rectangles 21a to 21e, the second rectangle 21b and the third rectangle 21c are overlapped with each other by one pixel column and the fourth rectangle 21d and the fifth rectangle 21e are overlapped with each other by one pixel column. In this case, either of two columns to be overlaid on each other is omitted in each overlapped portion. By doing so, two vertically extending columns of pixels are omitted to horizontally reduce the initial partial image by a factor of 28/30. As the result, the reduced image 22 shown in FIG. 4B is obtained.

The partial image 21 divided into five (5) accessible rectangular areas 21a to 21e transversely arranged as shown in FIG. 4A will be enlarged horizontally by a factor of 32/30.

As the accessible rectangular areas 21a to 21e have each 6 pixel-columns in the horizontal direction, the initial partial image 21 includes 30 columns (6 columns ×5) of pixels in total in the horizontal direction. In case of horizontally enlarging the partial image 21 by a factor of 32/30, the number of transversely arranged pixel-columns must be increased to 32 columns (30 columns×32/30) in an enlarged partial image. Accordingly, the initial partial image 21 can be transversely enlarged by a factor of 32/30 by adding two new columns of pixels thereto.

Figure 4C:
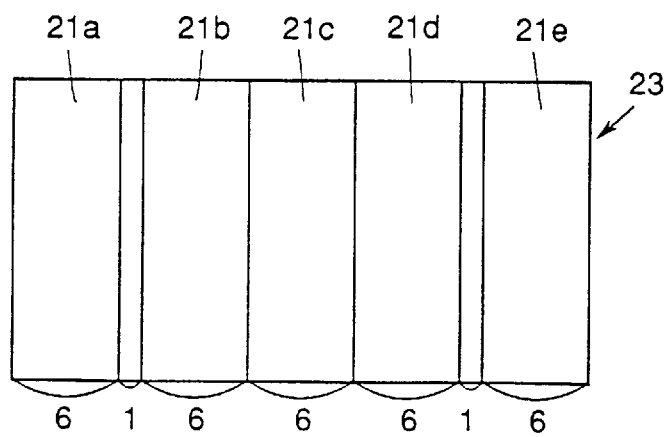
FIG. 4C is a vertically enlarged view of the partial images of FIG. 4A.

Two pixel columns are added to two of four boundaries of five accessible rectangle areas 21a to 21e of the partial image 21. Location of two columns is determined by calculations of functions int(5/7×n) like the case of enlarging the partial image 21 having five accessible rectangles by a factor 7/5 by adding two rectangles thereto. The function int(5/7×n) can be 1, 1, 2, 3, 4, 4 and 5 when n=1, 2, 3, 4 and 5. Accordingly, two columns may be added by one at the boundary between the first rectangle 21a and the second rectangle 21b and at the boundary between the fourth rectangle 21d and the fifth rectangle 21e as shown in FIG. 4C. Two vertically extending columns of pixels are added to horizontally enlarge the initial partial image by a factor of 32/30. As the result, the enlarged image 23 shown in FIG. 4C is obtained.

Additional columns of pixels may be complemented by the surrounding pixels. A simplified method is such that a pixel column of either of two rectangular areas being adjacent to the pixel-column inserting boundary can be repeatedly used. Namely, in case of FIG. 4C, either an extreme right pixel-column of the first rectangle 21a or an extreme left pixel-column of the second rectangle 21b and either an extreme right pixel-column of the fourth rectangle 21d or an extreme left pixel-column of the fifth rectangle 21e may be set twice respectively.

Figure 5A:
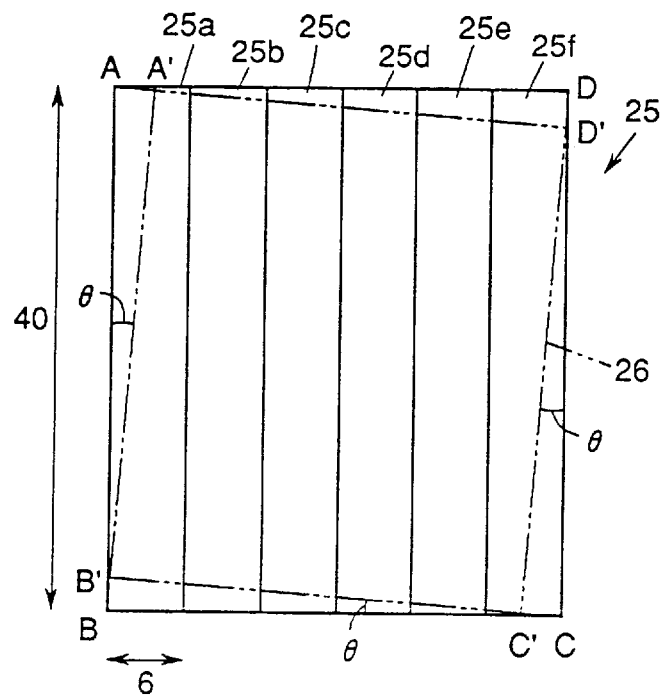
FIG. 5A is illustrative of partial images to be synthesized by an image synthesizing device according to the present invention.

The operation of turning a partial image is as follows:

As shown in FIG. 5A, a partial image 25 to be processed is divided into six (6) accessible rectangular areas 25a to 25f transversely arranged and each of the accessible rectangular areas 25a to 25f consists of m-rows by n-columns of pixels. The entire partial image 25 is turned at an angle θ, thereby obtaining a turned image 26 which is, as shown by two-dot chain line in FIG. 5A, enclosed by line segments formed by inclining every side of the partial image 25 at an angle θ. Vertices of the partial image 25 are represented by A, B, C and D, and vertices of the turned image 26 are represented by A', B', C' and D'. When a transversely extending side AD of the partial image 25 is inclined by an angle θ, the vertex D' of a side A'D' of the turned image 26 is displaced from the vertex D of the partial image 25 by a distance of (AD×tanθ) in a vertical direction. A triangle ABA' is supposed. The side A'D' of the turned image is shortened by a value of (AD×sin θ). The vertex B' and the side B'C' are the same as described above.

As the accessible rectangular areas 25a to 25f includes n columns of pixels in the horizontal direction, (6×n) pixels are arranged along the side AD, the vertices D' and B' are displaced respectively by (6×n×tan θ) pixels in a vertical direction and the sides A'D' and B'C' are transversely reduced respectively by (6×n×tan θ).

Accordingly, the horizontal displacement of the transversely extending side A'D' may be evenly distributed to the boundary portions of the accessible rectangular areas 25a to 25f and the vertical contraction of the side A'D' may be evenly distributed to the boundary portions of pixels in the vertical direction of the accessible rectangular areas.

The number of boundary portions of the accessible rectangular areas 25a to 25f is 5 (6−1). Therefore, the total vertical displacement (6×n×tan θ) is distributed to each boundary by {(6×n×tan θ) /5}. Accordingly, respective boundaries of the rectangular areas 25a to 25f are numbered, taking the boundary between the extreme left area 25a and the adjoining area 25b as a reference one and then every N-th number boundary is displaced downward by the number of pixels to be determined according to the following expression: int[{(6×n×tan θ)/5}×N].

The horizontal contraction of the turned image may also be realized by overlapping the adjoining areas at every N-th boundary by the number of pixels to be determined by int[{(6×n×sin θ)/5}×N].

The vertex A' of the turned image 26 is displaced from the vertex A of the partial image 25 by a distance of (AB×tan θ) in the horizontal direction. When a triangle AB'A' is supposed, the side A'B' of the turned image is shortened by a value of (AB×sin θ). The vertex C' and the side D'C' are the same as described above.

As the accessible rectangular areas 25a to 25f each includes m columns of pixels in the vertical direction, the vertices A' and C' are displaced respectively by (m ×tan θ) pixels in the horizontal direction and the vertically extending sides A'B' and C'D' are transversely reduced respectively by (m×tan θ) pixels.

The number of pixel boundary portions is (m−1) and they are numbered from top in turn. Every M-th boundary may be displaced to left or right by the number of pixels determined by int[{m×tan θ)/(m−1)}×M]. In this case, the displacing direction depends upon the turning direction.

The vertical contraction of the turned image may also be realized by overlapping the adjacent pixels at every M-th boundary by the number of pixels to be determined by the expression of int[{(m×sin θ)/(m−1)}×M].

Figure 5B:
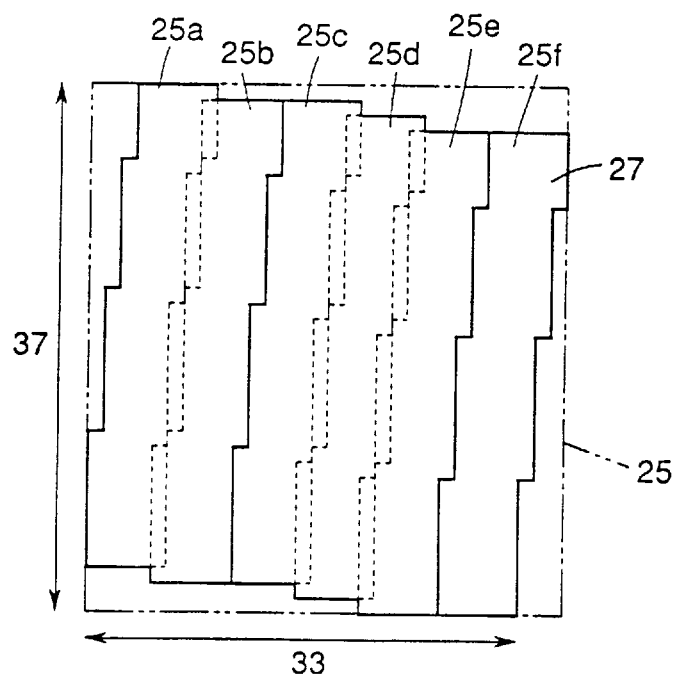
FIG. 5B is a turned view of the partial images of FIG. 5A.

FIG. 5B shows a turned image 27 which is obtained by turning by 5° the partial image 25 of FIG. 5A having accessible rectangular areas 25a to 25f each consisting of 40 rows×6 columns of pixels. The turned image 27 is displaced transversely by 3.14 pixels (6×6×tan 5°) in a vertical direction and is contracted by 3.13 pixels (6×6×sin 5°) in a horizontal direction. Accordingly, the turned image, as compared with the partial image, is transversely displaced by the number of pixels determined by int {(3.14 /5)×N}=int (0.628×N) and is transversely contracted by the number of pixels determined by int {(3.13 /5)×N}=int(0.626×N) at every N-th boundary of accessible areas 25a to 25f. Consequently, each rectangle of the turned image 27 has 33 transversely arranged pixels. Since the vertical displacement is 3.50 pixels (40×tan 5°) and horizontal contraction is 3.49 pixels (40×sin 5°), the turned image is displaced at every M-th boundary of the accessible areas 25a–25f by pixels of int {(3.50/39)×M}=int(0.09×M) in a vertical direction and is contracted at every M-th boundary by pixels of int {(3.49/ 39)×M }=int(0.089×M) in a vertical direction. As the result of this, the each rectangular area includes 37 vertically arranged pixels.

Figure 6:
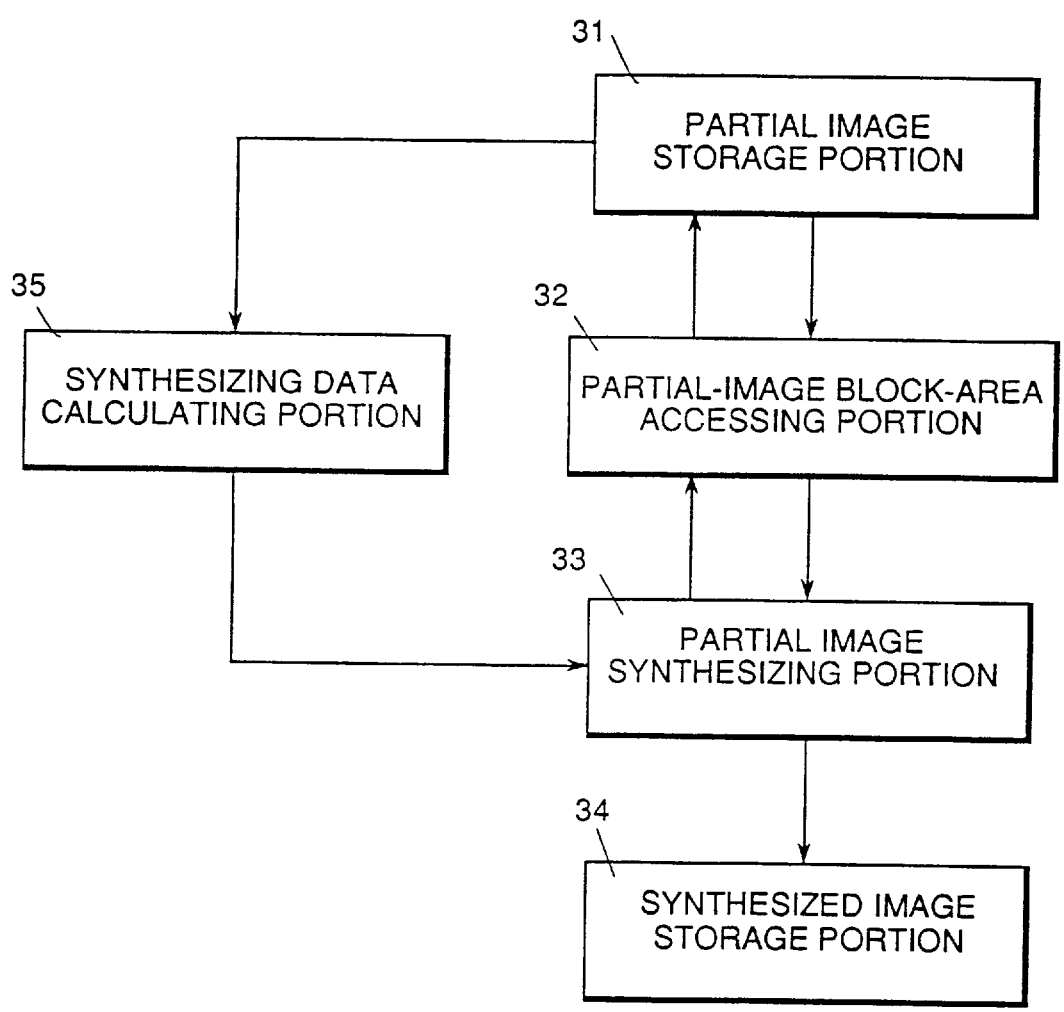
FIG. 6 is a block diagram showing another embodiment of an image synthesizing device according to the present invention.

FIG. 6 is a block diagram showing another image synthesizing device embodying the present invention. In this embodiment, accessible square blocks of a partial image stored in a partial image storage portion 31 are accessed one by one by a partial-image block-area accessing portion 32 according to synthesizing data prepared by a synthesizing data calculating portion 35 under the control of a partial image synthesizing portion 33. The accessed blocks of a partial image are combined by the partial image synthesizing portion 33 on the basis of the synthesizing data and an obtained synthesized image is stored in a synthesized image storage portion 34.

Figure 7A:
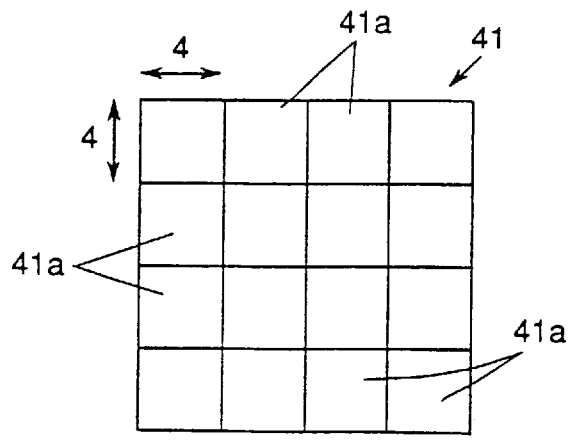
FIG. 7A is illustrative of a partial image to be synthesized by an image synthesizing device according to the present invention.

As shown in FIG. 7A, a partial image 41 is divided, for example, into 16 accessible square blocks 41a (4×4 blocks), which can be accessed one by one by the partial-image block-area accessing portion 32. The number of accessible blocks may relate to the quality of synthesizable partial images after enlarging or reducing or turning operation. It may be said that more fine divisions of partial images can improve the quality of a synthesized image.

In this embodiment, like the aforementioned embodiment, the partial image 41 can be enlarged by setting twice or more adjoining pixel rows or columns in each accessible block-area 41a or it can be reduced by setting reduced adjoining pixel rows or columns in each accessible block-area 41a.

On the conditions that the partial image is processed with a small enlarging or reducing ratio or has sufficiently small blocks or deterioration of its quality is permissible, high-speed image processing may be realized by shifting the arrangement of accessible block-areas 41a.

Figure 7B:
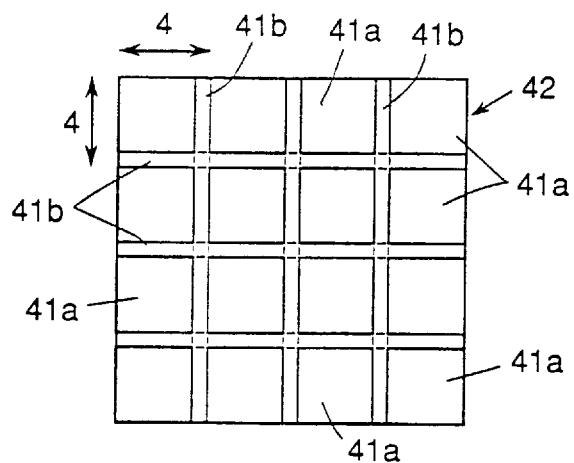
FIG. 7B is an enlarged view of the partial image of FIG. 7A.

FIG. 7A shows a partial image 41 having 16 accessible block-areas 41a, each of which consists of 4 by 4 pixels (4 rows×4 columns). The partial image 41 is now enlarged by a factor of 19/16. As the number of pixels in vertical direction of the partial image 41 is 16 pixels (4×4=16), the number of pixels in vertical direction of the enlarged image is 19 pixels (16×19/16=19). Accordingly, 3 pixels (19−16=3) must be added in a vertical direction. As the number of boundaries between accessible block-areas 41a of the partial image 41 is 3 (4 blocks−1=3), FIG. 7B shows accessible block-areas 41a are so re-arranged that a space for one row of pixels is formed at every boundary between the block-areas to write a row 41b of pixels therein. Adding a row of pixels in a vertical direction can be realized by setting twice a row of pixels of either of two accessible block-areas 41a being adjacent to the boundary therebetween or by complementing with surrounding pixels. The partial image 41 can be also enlarged transversely by adding three (3) columns 41b of pixels by one at each boundary between the block-areas 41a in the horizontal direction. The totally enlarged image 42 is thus obtained.

Figure 7C:
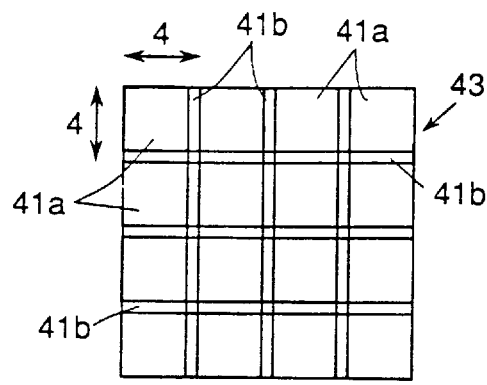
FIG. 7C is a reduced view of the partial image of FIG. 7A.

The partial image 41 is now reduced by a factor of 13/16 as follows:

As the partial image 41 has 16 pixels in a vertical direction, a contracted image must has 13 pixels (16×13/16=13) in a vertical direction, which means reduction of pixels by 3 pieces (16−13=3) in a column. As the number of boundaries between accessible block-areas 41a of the partial image 41 is 3 (4 blocks −1=3), one column 41b of pixels is omitted at every boundary portion of the block-areas 41a as shown in FIG. 7C. Omitting a row 41b of pixels can be realized by erasing a pixel column in either of two accessible block-areas 41a being adjacent to the boundary therebetween and then by displacing adjoining block-area 41a to cover the erased row of pixel of the block-area 41a. The partial image 41 is also reduced transversely by omitting three (3) pixel columns 41b by one at each boundary between the block-areas 41a in the horizontal direction. The totally contracted image 43 is thus obtained.

As mentioned above, it is possible to rapidly enlarge or reduce the partial image 41 by adding or omitting a row or column of pixels into or from each boundary portion of two adjacent accessible block-areas 41a after or before shifting the location of said areas.

In the shown embodiment, it is also possible to rapidly process with turning the partial image by changing location of accessible block-areas.

Figure 8A:
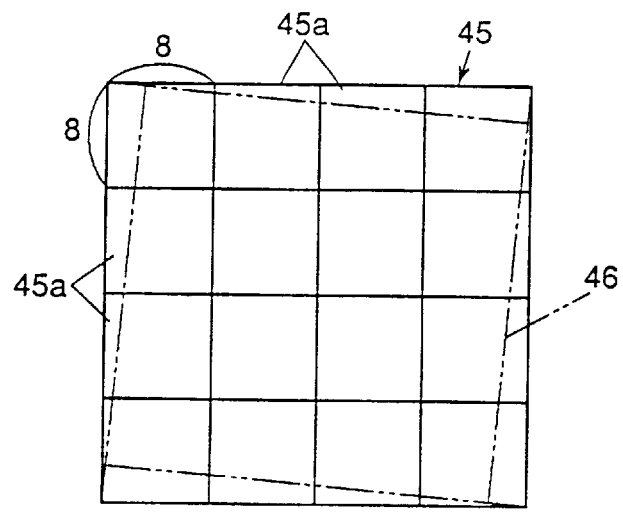
FIG. 8A is illustrative of a partial image to be synthesized by an image synthesizing device according to the present invention.

FIG. 8A shows a processable partial image 45 having 16 (4 by 4) accessible block-areas 45a, each of which is consists of 64 pixels (8 rows by 8 columns). This partial image is now turned by 50 as follows. In this case, like the aforementioned embodiment, the entire partial image 45 is simply turned by an angle e to obtain a turned image 46 which is, as shown by two-dotted chain line in FIG. 8A, enclosed by line segments formed by turning every side of the partial image 45 by an angle θ.

Accordingly, the transversely extending sides may be displaced vertically by (8×4×tan 5°) pieces of pixels and is contracted by (8×4×sin 5°). Vertical displacement and contraction of horizontally extending sides can be realized by displacing accessible block-areas 45a.

The number of boundary portions of the accessible rectangular areas 45a is 3 (4−1). Therefore, a displacement and contraction of each block-area 41a at a N-th boundary are determined as:

int[{(8×4×tan 5)/3}N]=int(0.93×N) and int[{(8×4×sin 5)/3}N]=int(0.93×N) respectively.

Concerning vertically extending sides, a horizontal displacement and vertical contraction of each block are a 41a at a N-th boundary are also determined as:

int[{(8×4×tan 5)/3}×N] and int[{(8×4×sin 5)/3}×N] respectively.

Figure 8B:
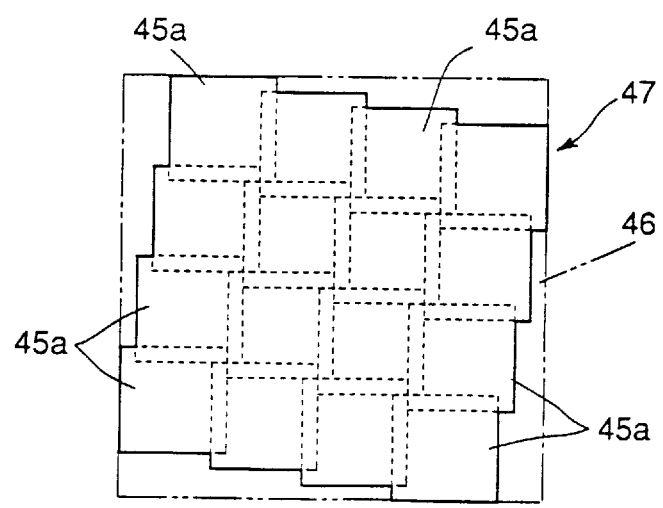
FIG. 8B is a turned view of the partial images of FIG. 8A.

An obtained turned image 47 is shown in FIG. 8B.

In synthesizing partial images as be processed by enlarging, reducing and turning accessible block-areas, there is still a fear that adjoining partial images may not be properly combined with each other at boundary portions. Variations of crossed-axes angles between an object and an optical axis of a camera when taking partial images may cause a matching error of several pixels at boundary portions of the partial images. A matching error of several pixels may also be brought by a calculation (matching) error for synthesizing partial images.

Figure 9A:
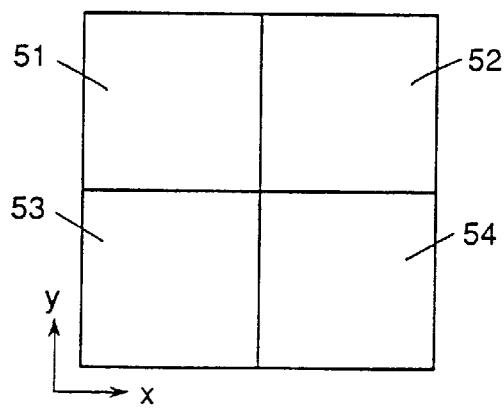
FIG. 9A is illustrative of an image synthesized by an image synthesizing device according to the present invention.
Figure 9B:
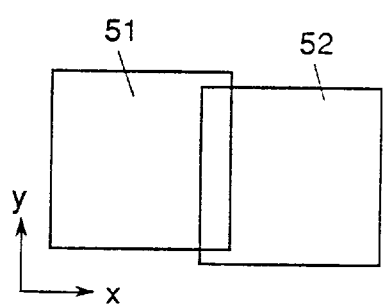
FIGS. 9B, 9C, 9D and 9E are illustrative of a relationship between adjacent partial images.
Figure 9C:
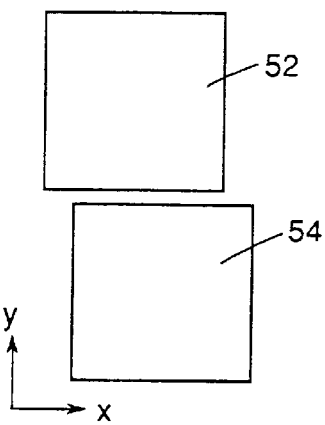
Figure 9D:
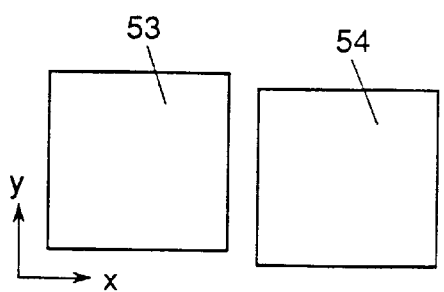
Figure 9E:
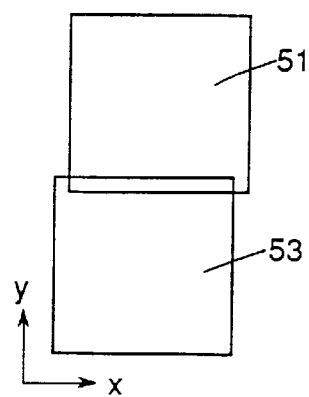

FIG. 9A shows square-block partial images 51–54 each consisting of, e.g., 100 by 100 pixels (100 rows by 100 columns), which are to be synthesized as arranged by two in a vertical direction and by two in a horizontal direction. FIGS. 9B to 9E show results of calculations (matching) for aligning adjacent partial images. In FIG. 9B, the partial image 52 is moved by 10 pixels in x-axis direction and by 4 pixels in y-axis direction to match with the partial image 51. Such condition (displacement) is expressed as [51]=[52]+(10, 4).

Similarly, the partial images 52 and 54 (FIG. 9C) have an expression [52]=[54]+(−10, 6), the partial images 54 and 53 (FIG. 9D) have an expression [54]=[53]+(8, −3) and the partial images 53 and 51 (FIG. 9E) have an expression [53]=[51]+(−4, 5).

When synthesis of the partial images 51, 52, 54, 43 is performed in the shown order on the basis of the above-mentioned matching calculation results of displacement values of the partial images in x-axis direction and y-axis direction are accumulated. Consequently, the partial images 51 and 53 are displaced by (10, 4)+(−10, 6)+(8, −3)+(−4, 5)=(4, 12) in x-direction and y-direction. A whole image is synthesized with a displacement larger than the matching result (−4, 5).

Accordingly, it is devised to moderate displacement of adjacent partial images by averaging accumulated displacement values in x-direction and y-direction and allocate the values at every boundary between adjacent partial images when synthesizing the partial images. In case of FIG. 9, the accumulated displacement value (4, 12) may be evenly allocated into 4 boundary portions of the partial images 51–54. At each boundary portion (whereat adjoining partial images are butted to each other), the displacement value is corrected by a value of (4/4, 12/4)=(1, 3). Consequently, the displacement between the partial images 51 and 52 is corrected to (10−1, 4−3)=(9, 1), the displacement between the partial images 52 and 54 is corrected to (−10−1, 6−3)=(−11, 3), the displacement between the partial images 54 and 53 is corrected to (8−1, −3−3)=(7, −6) and the displacement between the partial images 53 and 51 is corrected to (−4−1, 5−3)=(−5, 2).

A synthesized image does not show joined portions of the partial images therein by thus averaging and distributing the total displacement.

In the above-mentioned case, the total displacement, instead of being evenly distributing to 4 boundary portions of partial images, may also be concentrically allocated to one or two partial images if they include quiet (not featured) image areas that may efface displacement. Images of paper ground or of gradually varying density may not show the displacement. On the contrary, images of characters, figures, lines, boundary lines show displacement remarkably. A featuring image can be discriminated, for example, by an intensity of image-density frequency components. Namely, an image may be judged to be featuring with a number of fine figures if its density-relating frequency component is intensive, whilst it may be judged not to be featuring and have a very small amount of fine figures if its density-relating frequency component is weak.

As mentioned above, apparent displacement of images may also be reduced by concentrically compensating a total displacement in quiet image portions.

Although the above-described embodiment is designed to distribute a large displacement, which may be produced between the first partial image and the last partial image when successively combining a plurality of adjoining partial images, to every or specified boundary portion when synthesizing adjacent partial images, it is also possible to synthesize an image compensated for a total displacement by changing an enlarging ratio and a turning angle of each partial image.

Figure 10A:
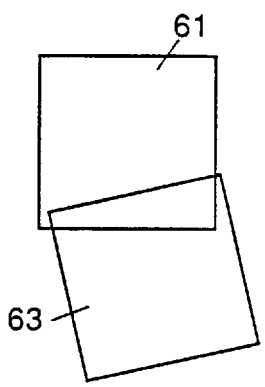
FIGS. 10A, 10B, 10C and 10D are illustrative of relationship between adjacent partial images of an image to be synthesized by an image synthesizing device according to the present invention.
Figure 10B:
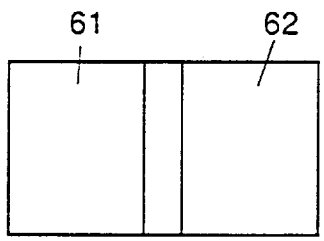
Figure 10C:
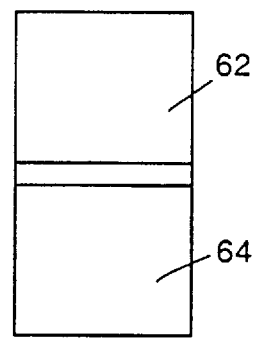
Figure 10D:
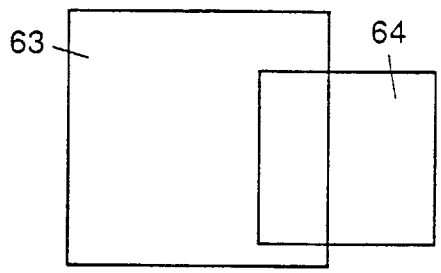

For example, in case of synthesizing four partial images into one partial image, it is supposed that synthesizing information shows that least displacement is realized by synthesizing adjacent partial images as shown in FIGS. 10A to 10D. Namely, partial images 61 and 63 are synthesized as turned mutually in a vertical direction with overlapping each other as shown in FIG. 10A; partial images 61 and 62 are synthesized as be horizontally overlapped each other without being turned as shown in FIG. 10B; partial image s 62 and 64 are synthesized as be vertically overlapped each other without being turned as shown in FIG. 10C; and partial images 63 and 64 are synthesized as be horizontally overlapped each other without being turned as shown in FIG. 10D.

In successively synthesizing the adjacent partial images 61–64, a large amount of displacement may occur between the first synthesized partial image and the last synthesized image, depending upon the order of synthesizable images.

Figure 10E:
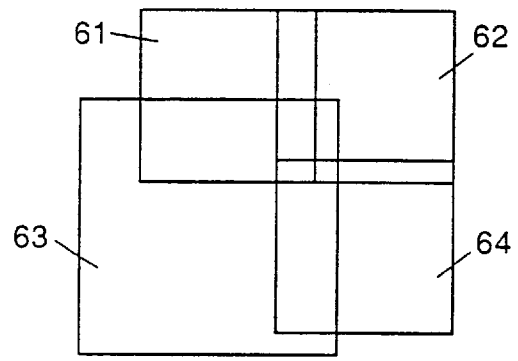
FIG. 10E is illustrative of an example of a synthesized image.

For example, the partial image 61 and 62 are synthesized first as shown in FIG. 10B, the synthesized partial image (61, 62) is combined with the partial image 64 as shown in FIG. 10C and then the synthesized partial image (61, 62, 64) is combined with the partial image 63 as shown in FIG. 10D to form a synthesized image shown in FIG. 10E. The obtained synthesized image may have a large amount of displacement because the partial images 61 and 63 therein do not realize the relationship indicated in FIG. 10A.

Similar displacement may occur as a result of error accumulation of calculation on synthesizing data such as those of FIGS. 10A to 10D.

Figure 10F:
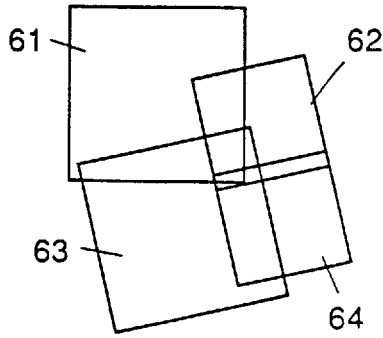
FIG. 10F is illustrative of another example of a synthesized image.

The partial image 61 and 63 are synthesized first as shown in FIG. 10A, the synthesized partial image (61, 63) is combined with the partial image 64 as shown in FIG. 10C and then the synthesized partial image (61, 63, 64) is combined with the partial image 62 as shown in FIG. 10B to form a synthesized image shown in FIG. 10F. The obtained synthesized image may have a large amount of displacement because the partial images 61 and 62 therein do not realize the relationship indicated in FIG. 10B.

Figure 10G:
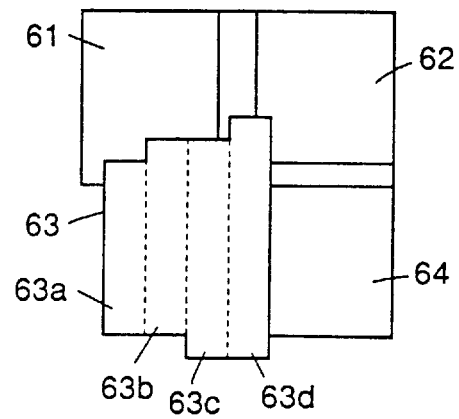
FIG. 10G is illustrative of an example of an image synthesized by the image synthesizing device according to the present invention.

Accordingly, in the former case of synthesizing partial images 61, 62, 64 and 63 in turn, the image synthesizing device of FIG. 1 divides the last synthesizable partial image 63 into 4 accessible rectangular areas 63a to 63d as shown in FIG. 10G, enlarges or reduces the accessible rectangular area 63d to overlap the partial image 64 adjacent thereto according to the relationship indicated in FIG. 10D and then enlarges or reduces the accessible rectangular areas 63a to 63c to overlap the partial image area 61 according to the relationship indicated in FIG. 10A. Thus deformed rectangles 63a to 63d of the partial image 61 may approximate the turned overlapping condition shown in FIG. 10A with a decreased displacement between the partial images 61 and 63 therein.

In the latter case of synthesizing partial images 61, 63, 64 and 62 in turn, the last synthesizable image 62 may be divided into a plurality of accessible rectangular areas and each of the areas is enlarged or reduced in size or turned.

In the image synthesizing device of FIG. 6, the last synthesizable partial image may be divided into a plurality of accessible block areas, be processed one by one by enlarging or reducing or turning and then synthesized in a suitably deformed state.

It is also possible to rapidly synthesize a plurality of accessible block-areas as only displaced without enlarging, reducing and turning.

Figure 11:
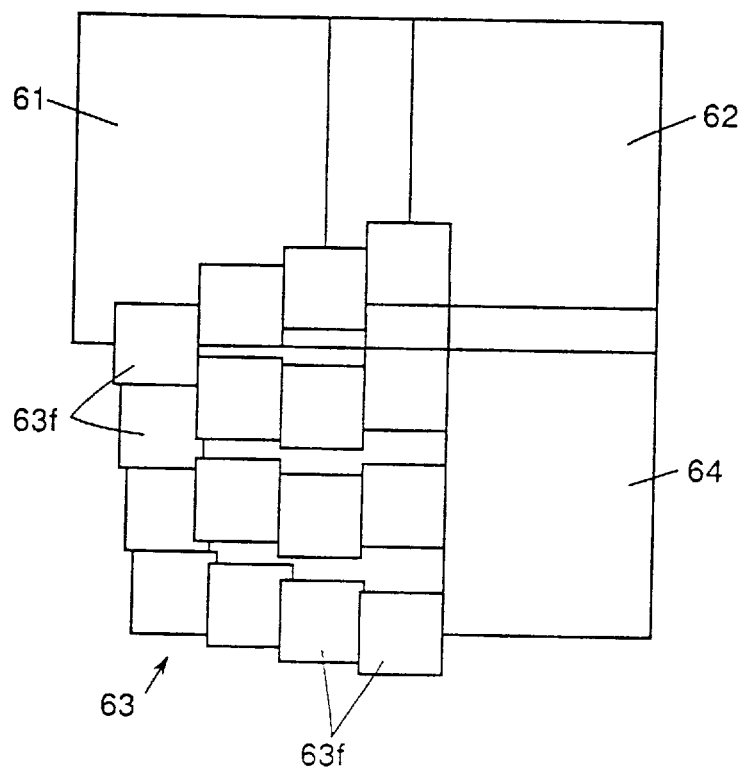
FIG. 11 is a view for explaining another example of an image synthesized by an image synthesizing device according to the present invention.

In case of synthesizing partial images 61 to 64 shown in FIGS. 10A to 10D, for example, in the order of images 61, 62, 64 and 63, the last synthesizable partial image 63 is divided into 4 by 4 square blocks 63f as shown in FIG. 11. Two vertical columns each consisting of 4 block-areas 63f overlapping the adjacent partial image 64 are rearranged to form an enlarged space between the block-areas. Each enlarged space between the block-areas 63f is filled with surrounding pixels or pixels to be written therein by repeatedly setting pixels adjacent to the boundary between the block-areas. Accessible block-areas of the partial image 61 are vertically moved to decease the displacement between the partial images 61 and 63. The synthesized image may have a reduced amount of displacement between the partial images 61 and 63.

Figure 12:
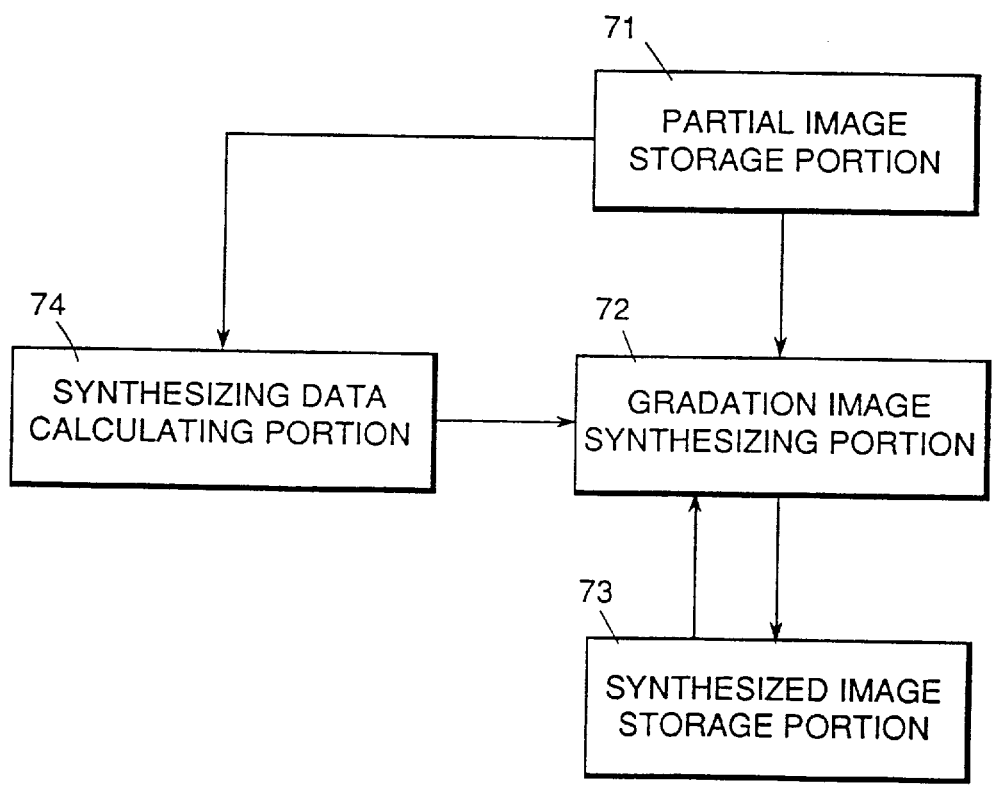
FIG. 12 is a block diagram showing another image synthesizing device embodying the present invention.

FIG. 12 is a block diagram showing another image synthesizing device embodying the present invention. In this embodiment, partial images stored in a partial image storage portion 71 are synthesized by a gradation image synthesizing portion 72 on the basis of synthesizing information prepared by a synthesizing data calculating portion 74 and an obtained synthesized image is stored in a synthesized image storage portion 73.

Figure 13A:
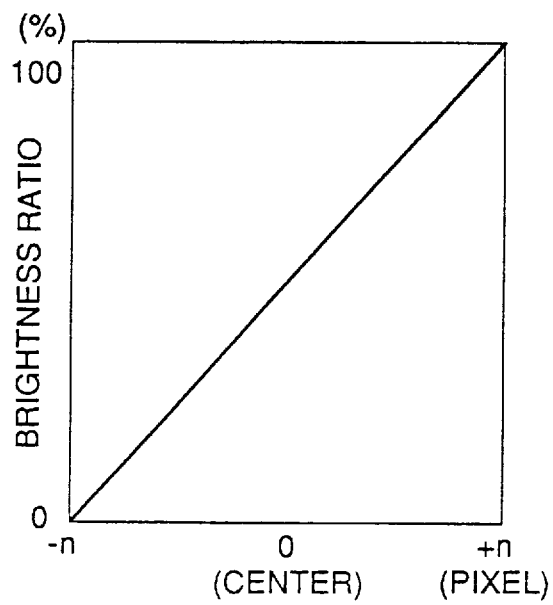
FIGS. 13A and 13B are graphs for explaining the operation of a gradation image synthesizing portion of the image synthesizing device of FIG. 12.
Figure 13B:
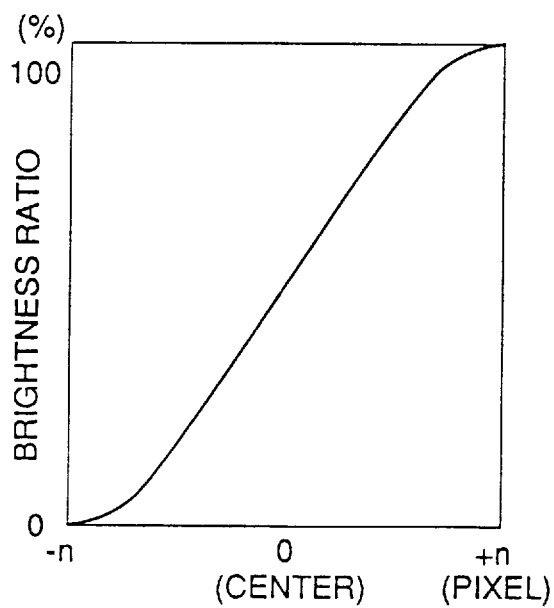

The gradation image synthesizing portion 72 combines partial images into one image, providing synthesizable partial images with such variable gradation that brightness ratio of pixels mutually superimposed in an overlapped portion gradually decreases from the start portion of the overlap to the end portion thereof. Referring to FIG. 13A, n-pieces of pixels from a center line (portion 0 on the abscissa) in an overlapped portion of two partial images may be gradated by linearly changing the brightness ratio of the superimposed pixels in proportion to the distance from the center line. The gradation can be easily realized by linearly changing the ratio of the pixel brightness. The brightness ratio of pixels may also be changed gamma-linearly as shown in FIG. 13B. This may smoothly change the brightness at the starting portion as well as the ending portion of the overlap of partial images, making the overlap be not noticeable.

The synthesizing data calculating portion 74 calculates synthesizing data on the basis of affine transformation using trigonometric functions or matching technique. The gradation image synthesizing portion 72 makes an access to each pixel of each partial image stored in the partial image storage portion 71 according to the calculation result given by the synthesizing information calculating portion 74.

To change the brightness ratio of pixels in an overlapped portion of partial images, it is also possible to access each accessible rectangle or block of each partial image stored in the partial image storage portion 71 by using a partial-image rectangle-or block-area accessing portion like the before-described embodiments. In this case, the usable partial image synthesizing portion 3 shown in FIG. 1 may also serve as the gradation image synthesizing portion and the synthesizing data calculating portion 74 may generate information necessary for enlarging, reducing and turning each accessible rectangle-area or block-area like the before-described embodiments.

Figure 14:
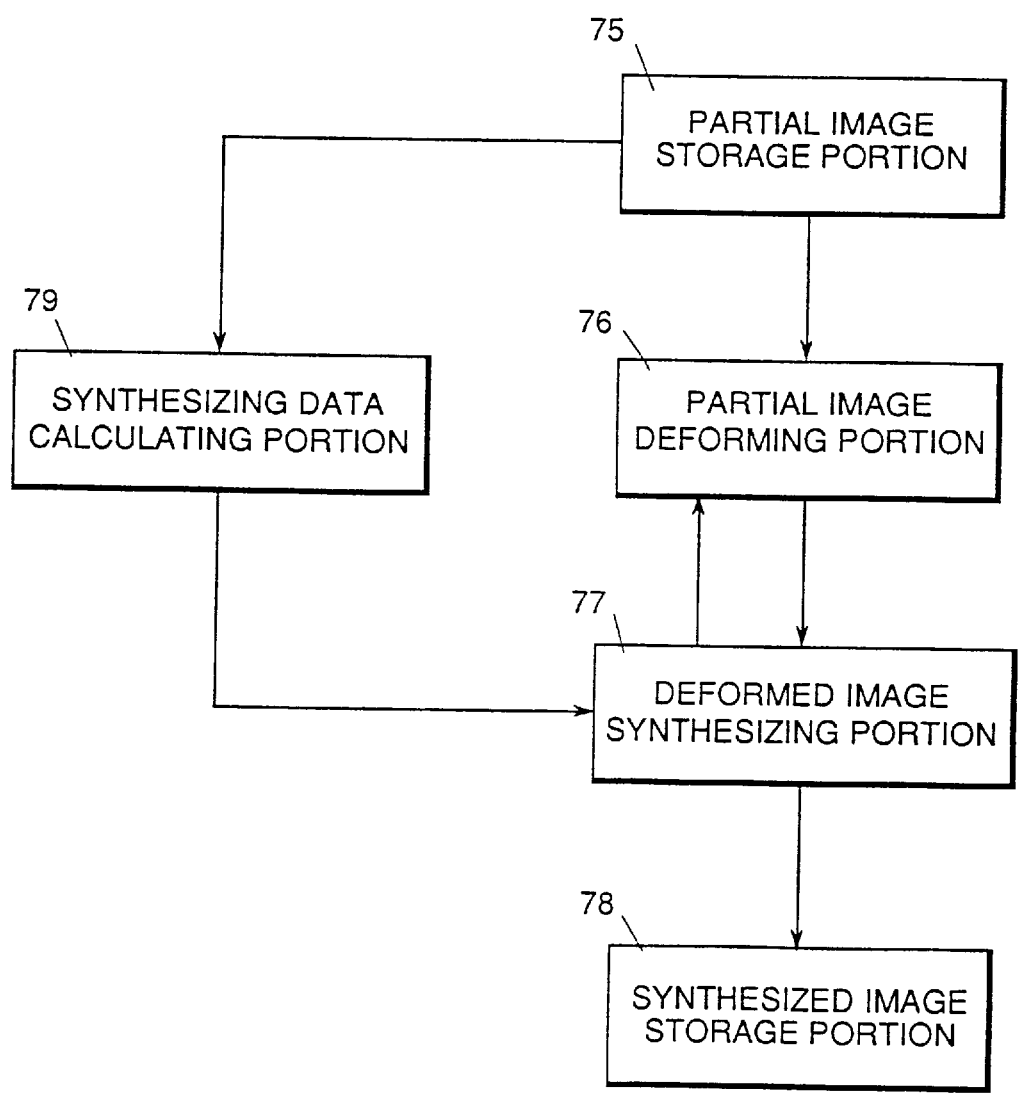
FIG. 14 is a block diagram showing another image synthesizing device embodying the present invention.

FIG. 14 is a block diagram showing another image synthesizing device embodying the present invention. In this embodiment, partial images stored in a partial image storage portion 75 are deformed by a partial image deforming portion 76 under the control of a deformed image synthesizing portion 77 on the basis of synthesizing information prepared by a synthesizing data calculating portion 79, then the deformed partial images are synthesized by the deformed image synthesizing portion 77 and stored in a synthesized image storage portion 78.

If there is a fear of clipping a synthesizable image when being stored in the synthesized image storage portion 78 because of the size limitation thereof, the deformed image synthesizing portion 76 deforms synthesizable partial images to obtain a synthesized image to be stored without clipping (or with minimal clipping) in the synthesized image storage portion 78.

For example, three (3) rectangular partial images 81, 82, 83 will be vertically synthesized as turned in the same direction with overlaps of their joining portions as shown in FIG. 15A. The synthesizable image, however, may be clipped off its protrusion as shown in FIG. 15B because the synthesized image storage portion 78 is designed to usually store rectangular synthesized images.

To prevent this, the partial image deforming portion 76 deforms the tilted partial image 82 overlapping the partial image 81 so that it is not turned relative to the image 81 excepting the portion overlapped with the image 81, and then it deforms the turned partial image 83 overlapping the partial image 82 so that it is not turned relative to the image 82 excepting the portion overlapped with the image 82. Namely, deformed images 82' and 83' shown in FIG. 15C are obtained by enlarging right-side (turned-up) portions of respective partial images 82 and 83 in a vertical direction and reducing the left-side portions of the respective partial images 82 and 83 in a vertical direction. The deformed images 82' and 83' may be stored without clipping in the synthesized image storage portion 78.

Besides thus successively turned partial images, three (3) vertically arranged partial images 84, 85 and 86 may be transversely displaced from each other as shown in FIG. 16A. In this case, the partial image 85 overlapping the partial image 84 is deformed into a trapezoid having a slant side in the direction opposite to the displaced direction and the partial image 86 is deformed into a similar trapezoid. The deformed image synthesizing portion 77 synthesizes a deformed image 85' in backward replaced state with the partial image 84 and then a deformed image 86' in backward replaced state with the deformed image 85'.

The image synthesized from thus modified partial images containing complete information and maintaining relationship between partial images therein can be stored in the synthesized image storage portion 78 having a limited capacity.

Figure 17A:
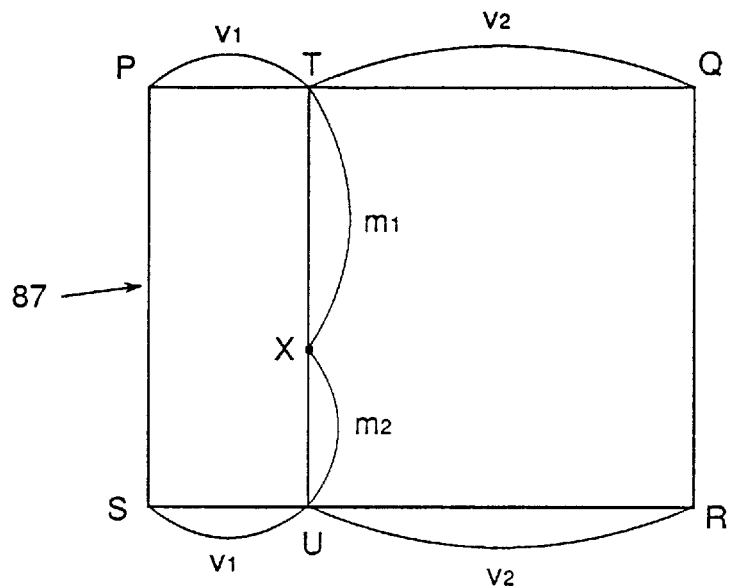
FIG. 17A is illustrative of another example of a partial image processed by the image synthesizing device of FIG. 14.
Figure 17B:
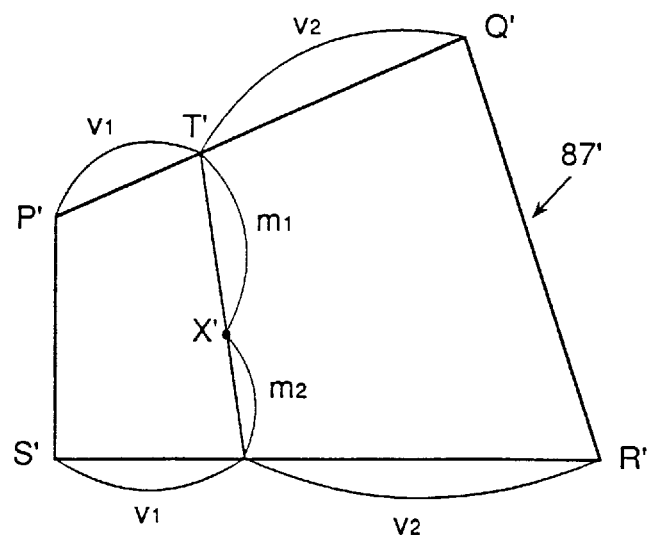
FIG. 17B illustrates another example of modifying a partial image by a partial image deforming portion.

In the shown embodiment, in deforming the partial images stored in the partial image storage portion 75, the partial image deforming portion 76 sets a point on each deformed image, which corresponds to a specified point on the corresponding partial image, in the following manner:

For example, a partial image 87 being a rectangle PQRS shown in FIG. 17A will be deformed into a modified image 87' being a rectangle P'Q'R'S'. In this case, the rectangle PQRS of the partial image 87 has a point U set on a side SR at a ratio of SU : UR=$v_1 : v_2$ and a point T set on a side PQ at a ratio of PT : TQ=$v_1 : v_2$. A point X is also set on a segment TU at a ratio of TX : XU=$m_1 : m_2$. The point U and the point T on the rectangle PQRS of the partial image 87 are set respectively as a point U' dividing a side S'R' at the ratio of $v_1 : v_2$ and T' dividing a side P'Q' at the ratio of $v_1 : v_2$ on the rectangle P'Q'R'S' of the deformed image 87'. The point X set on the segment TU of the rectangle PQRS of the partial image 87 is also set as a point X' dividing a segment TU' at the ratio of $m_1 : m_2$ on the rectangle P'Q'R'S' of the deformed image 87'.

In this embodiment, the synthesizing information calculating portion 79 calculates synthesizing data on the basis of affine transformation using trigonometric functions and matching technique and the partial image deforming portion 76 make an access to a whole partial image stored in the partial image storage portion 75.

In the embodiment, it is also possible to access each accessible rectangle or block of each partial image stored in the partial image storage portion 75 by using a partial-image rectangle- or block-area accessing portion like the before-described embodiments. In this case, the synthesizing data calculating portion 79 may generate information necessary for enlarging, reducing and turning each accessible rectangle-area or block-area like the before-described embodiments.

Figure 18:
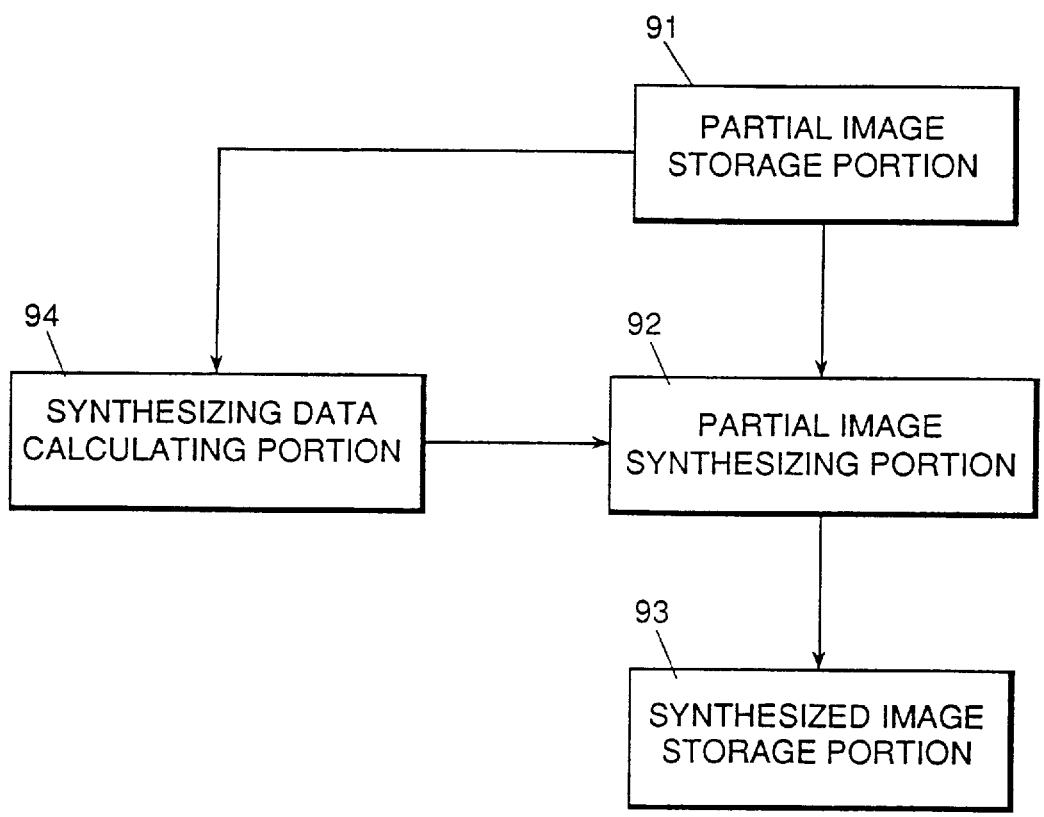
FIG. 18 is a block diagram for explaining another image synthesizing device embodying the present invention.

FIG. 18 is a block diagram showing another image synthesizing device embodying the present invention. In this embodiment, partial images stored in a partial image storage portion 91 are entirely accessed and synthesized by a partial image synthesizing portion 92 on the basis of synthesizing information prepared by a synthesizing data calculating portion 94, then the synthesized image is stored in a synthesized image storage portion 93.

This embodiment is featured in that a portion of an image synthesized by the partial image synthesizing portion 91, which may be clipped in storing into the synthesized image storage portion 93, can be set in a vacant area of the synthesized image storage portion 93.

For example, three (3) vertically arranged partial images 81, 82, 83 will be synthesized in turn as turned in the same direction as shown in FIG. 15(a). In the synthesized image storage portion 93, there is a space at the opposite (left) side to turning direction of the turned partial images 82 and 83. Accordingly, the right-side (turned side) portions 82a, 83a of the partial images 82, 83, which may be clipped without storing in the synthesized storage portion, are stored utilizing the left-side space.

Figure 19A:
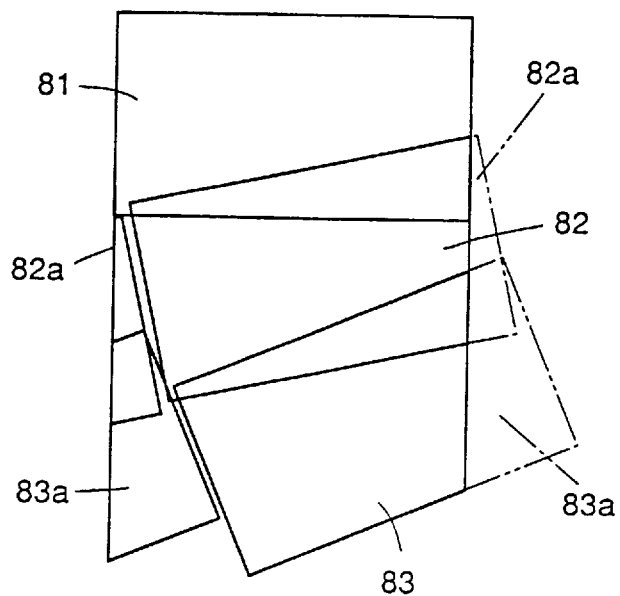
FIGS. 19A and 19B are views for explaining examples of partial images synthesized by a partial image synthesizing portion of the image synthesizing device of FIG. 18.
Figure 19B:
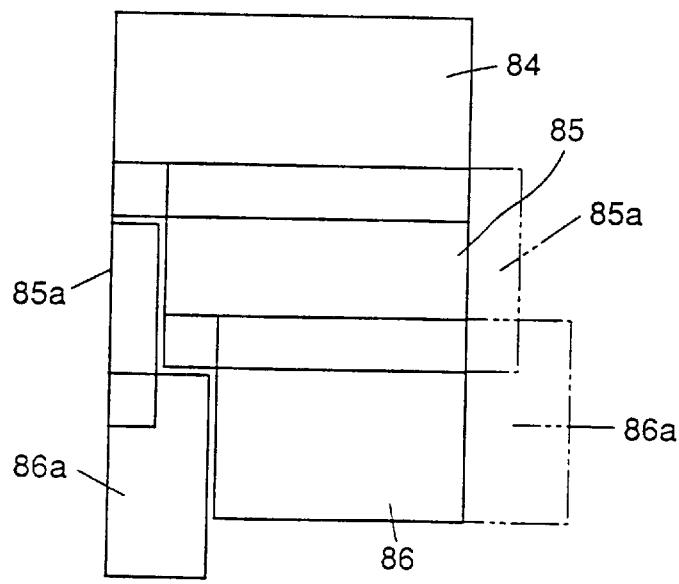

Three (3) vertically arranged partial images 84, 85 and 86 may be displaced stepwise from each other in a transverse direction as shown in FIG. 19B. In this case, a space is formed at the opposite (left) side to the displacing direction (right side) of the partial images 84, 85, 86. Accordingly, the right-side extrusions 85a, 86a of the partial images 85, 86 are stored in the left-side space in the synthesized image storage portion 93.

In a memory having two-dimensional addresses, addresses are allocated in the raster form to be written in turn in a horizontal line from left to right and in vertical line from top to bottom. Accordingly, in an equation for calculating a memory address from the co-ordinate values, a portion of image extending over the right-end is shifted to the left end in the next vertical line (row) for calculation. This means that no special calculation is required for determining an area of a synthesized image to be clipped. Addresses calculated from the co-ordinate values may be directly written. The image portion extending over the right end is written in the left end of next row. When an image portion extends over the left end, it is transferred to the right end of the preceding row wherein it is calculated and written.

In the before-described embodiment wherein an oversized portion of a synthesized image is modified to be stored in the synthesized image storage portion 93, there is left a fear of deterioration of an image synthesized from the deformed partial images. On the contrary, the present embodiment can store over-sized portions of a synthesized image in vacant area of the synthesized image storage portion 93, preventing said portions from being clipped off. There is no fear of distortion of the synthesized image and of lacking information on the synthesizable image.

In an image synthesizing device according to the present invention, a synthesizing data calculating portion calculates synthesizing information for each partial image stored in a partial image storage portion, a partial image accessing portion accesses each accessible tetragonal area of each partial image stored in the partial image storage portion and enlarging or reducing or turning each accessed area of each partial image on the basis of the synthesizing information obtained by the synthesizing data calculating portion, a partial image synthesizing portion synthesizes partial images processed by the partial image accessing portion according to the synthesizing information given from the synthesizing data calculating portion, and a synthesized image storage portion stores therein a synthesized image obtained by the partial image synthesizing portion.

Each partial image consists of accessible areas each made in the form of a rectangle or square-block. Each rectangular or square accessible area can be increased or decreased in size by increasing or decreasing the number of pixel rows or columns therein.

A partial image can be enlarged by adding one or more rows or columns of pixels between adjoining accessible areas or it can be contracted by overlapping areas adjacent to each other by reducing the number of pixel rows or columns therein.

Each partial image composed of rectangular accessible areas may be brought into a turned state by displacing each pixel row or column in a direction and by increasing or decreasing the number of pixels in rows or columns along the direction of displacement.

Each partial image composed of block accessible areas may be brought into a turned state by displacing adjacent areas relative to each other.

In sequentially synthesizing partial images by the partial image synthesizing portion, a displacement to be caused between a first partial image and a last partial image is first estimated and the estimated displacement value is allocated evenly to every joining portion of sequentially adjoining partial images, thereby eliminating the possible displacement in a whole image.

The estimated displacement producible between a first partial image and a last partial image of sequentially synthesizable adjacent images can be compensated by deforming a last synthesizable partial image. In this case, the partial image is more smoothly synthesized by changing a deforming amount for each accessible area thereof.

The partial image synthesizing portion is capable of changing gradation by changing a brightness ratio of pixels of overlapped portions of every partial image.

The partial image deforming portion is provided, which is capable of deforming each partial image stored in the partial image storage portion so that an image synthesized from partial images read from the partial image storage portion may be stored in the synthesized storage portion without overflowing therefrom. The partial images can be also stored keeping their interconnection in the partial image storage portion.

The synthesized image storage portion is capable of separately recording a part of synthesized partial images, which may overflow from the synthesized image storage portion, in a vacant area of the synthesized image storage portion. This prevents a synthesized image from being deformed by the effect of clipping of any partial image.

According to the present invention, it is possible to rapidly perform processing each partial image by enlarging or reducing or turning since accessible areas of the partial image, each of which consists of a plurality of rows and columns of pixels, can be accessed one by one in the storage portion.

In synthesizing partial images as being overlapped each other, it is possible to smoothly combine the partial images with gradually varying gradation by changing a brightness ratio of pixels in an overlapped portion thereof.

In synthesizing partial images, it is possible to modify any over-sized partial image to be stored without clipping in a synthesized image storage portion.

In synthesizing partial images, it is possible to reliably store an overflowing part of a synthesized image without being clipped and with no deformation in a vacant place in a synthesized image storage portion.

We claim:

1. An image synthesizing device comprising:
   a partial image storage portion for storing a plurality of partial images taken from a part of an object, said images having adjoining portions overlapping each other;
   a synthesizing data calculating portion for calculating synthesizing information for a plurality of the partial images stored in the partial image storage portion;
   a partial image accessing portion for accessing one by one accessible tetragonal areas into which each partial image is divided for storage in the partial image storage portion, each of said areas consisting of a plurality of pixel rows and columns and being processed by the partial image accessing portion on the basis of the synthesizing information obtained by the synthesizing data calculating portion;
   a partial image synthesizing portion for synthesizing partial images processed by the partial image accessing portion according to the synthesizing information from the synthesizing data calculating portion; and
   a synthesized image storage portion for storing a synthesized image obtained by the partial image synthesizing portion.

2. An image synthesizing device according to claim 1, wherein the partial image accessing portion makes an access to each of accessible rectangular areas of each partial image.

3. An image synthesizing device according to claim 1, wherein the partial image accessing portion makes an access to each of accessible square-block areas of each partial image.

4. An image synthesizing device according to claim 1, wherein the partial image accessing portion is capable of enlarging or reducing in size each partial image by increasing or decreasing the number of pixel rows or columns in each accessible area therein.

5. An image synthesizing device according to claim 1, wherein the partial image accessing portion is capable of enlarging or reducing in size each partial image by increasing or decreasing the number of pixel rows or columns in boundary portions of adjacent accessible areas of each partial image.

6. An image synthesizing device according to claim 2, wherein the partial image accessing portion is capable of bringing each partial image into turned state by displacing a pixel row or column in each accessible rectangular area of each partial image and at the same time by increasing or decreasing the number of pixels in the pixel row or column therein.

7. An image synthesizing device according to claim 3, wherein the partial image accessing portion is capable of bringing a partial image into turned state by relative arrangement of adjoining accessible block areas of partial images.

8. An image synthesizing device according to claim 1, wherein the partial image synthesizing portion previously calculates a displacement to be producible between in a first partial image and a last partial image of sequentially synthesizable adjacent partial images and allocates the calculated displacement to every combination of sequentially adjoining partial images.

9. An image synthesizing device according to claim 1, wherein the partial image synthesizing portion previously calculates a displacement to be producible between a first partial image and a last partial image of sequentially synthesizable adjacent partial images and compensates the calculated displacement by deforming the last synthesizable partial image.

10. An image synthesizing device according to claim 9, wherein the partial image synthesizing portion compensates the calculated displacement by changing every accessible area of the last synthesizable partial image.

11. An image synthesizing device according to claim 1, wherein the partial image synthesizing portion changes gradation by changing a brightness ratio of pixels of overlapped portions of every partial image.

12. An image synthesizing device according to claim 1, wherein it is further provided with a partial image deforming portion which is capable of deforming each partial image read from the partial image storage portion so that an image synthesized from partial images may be stored entirely with no overflowing part in the synthesized storage portion.

13. An image synthesizing device according to claim 1, wherein the synthesized image storage portion is capable of separately recording a part of synthesized partial images, said part being overflowable from the synthesized image storage portion, in a vacant area of the synthesized image storage portion.

14. An image synthesizing device according to claim 1 wherein the synthesizing data calculating portion processes selected data obtained from the overlapping portions of the partial images to calculate synthesizing information including reduction or enlargement and/or turning needed for synthesis of the partial images into a synthesized image.

* * * * *